United States Patent [19]

Thomas

[11] 4,303,255
[45] Dec. 1, 1981

[54] VEHICLE MULTISPEED DRIVE SYSTEM UTILIZING ARM AND LEG POWER

[76] Inventor: John C. Thomas, 1557 McKinley St., Eugene, Oreg. 97402

[21] Appl. No.: 109,644

[22] Filed: Jan. 4, 1980

[51] Int. Cl.³ .............................................. B62M 1/12
[52] U.S. Cl. .................................. 280/234; 280/236; 280/250
[58] Field of Search ............... 280/233, 234, 236, 238, 280/249, 250, 282

[56] References Cited

U.S. PATENT DOCUMENTS

| | | | |
|---|---|---|---|
| 2,390,719 | 12/1945 | Kurth | 280/234 |
| 2,533,728 | 12/1950 | Gedat et al. | 280/233 |
| 3,193,305 | 7/1965 | Hendricks | 280/250 |
| 3,352,173 | 11/1967 | Freeland | 280/236 |
| 3,910,599 | 10/1975 | Thomas | 280/234 |
| 4,109,927 | 8/1978 | Harper | 280/250 |
| 4,152,005 | 5/1979 | Vanore | 280/234 |

Primary Examiner—Joseph F. Peters, Jr.
Assistant Examiner—Donn McGiehan
Attorney, Agent, or Firm—James D. Givnan, Jr.

[57] ABSTRACT

A drive system for a vehicle permitting the use of an operator's arms and legs to power the vehicle. A multispeed hub assembly is offset from a powered wheel assembly and drives same with a roller chain. Arm and leg power is imparted respectively to a hand crankshaft and a live axle which power is transmitted to the multispeed hub via additional roller chains. A speed control for shifting the multispeed hub is actuated by handgrip rotation during normal hand crank operation to permit speed changes without release of either handgrip. A brake mechanism on the hand crankshaft actuates brake cables actuating caliper brakes upon reverse rotation of the hand crankshaft. The multispeed hub may include an internal coaster brake mechanism in one form of the invention.

11 Claims, 7 Drawing Figures

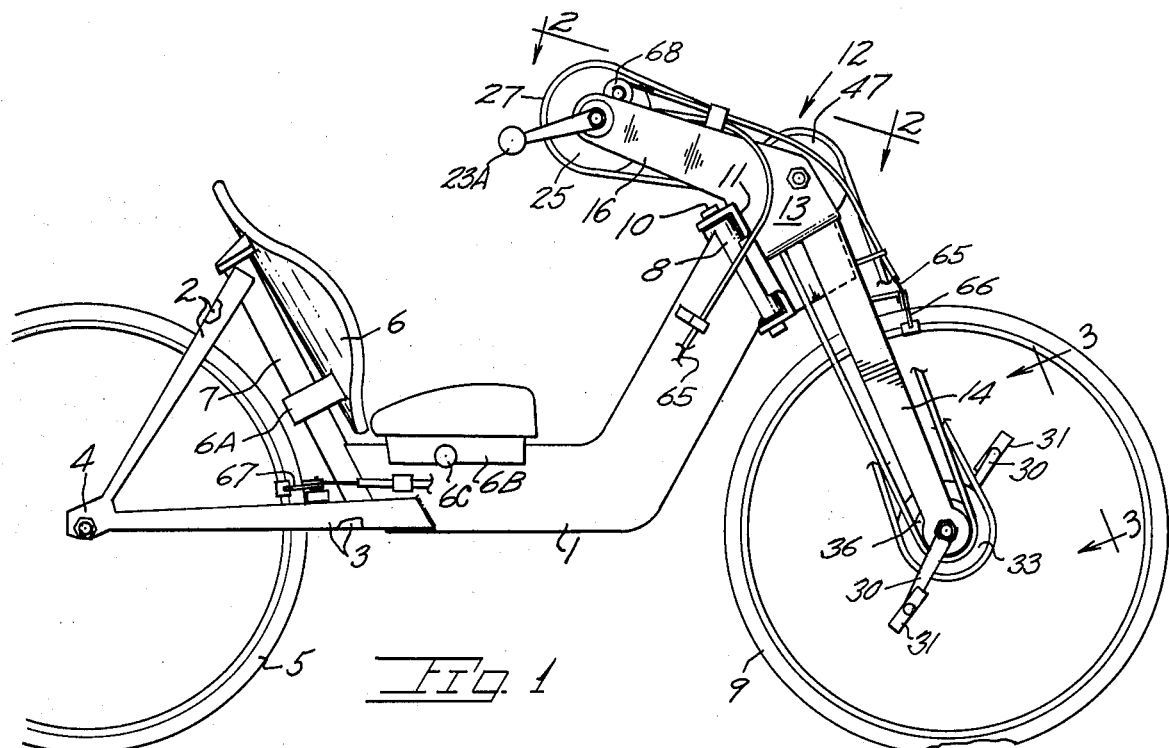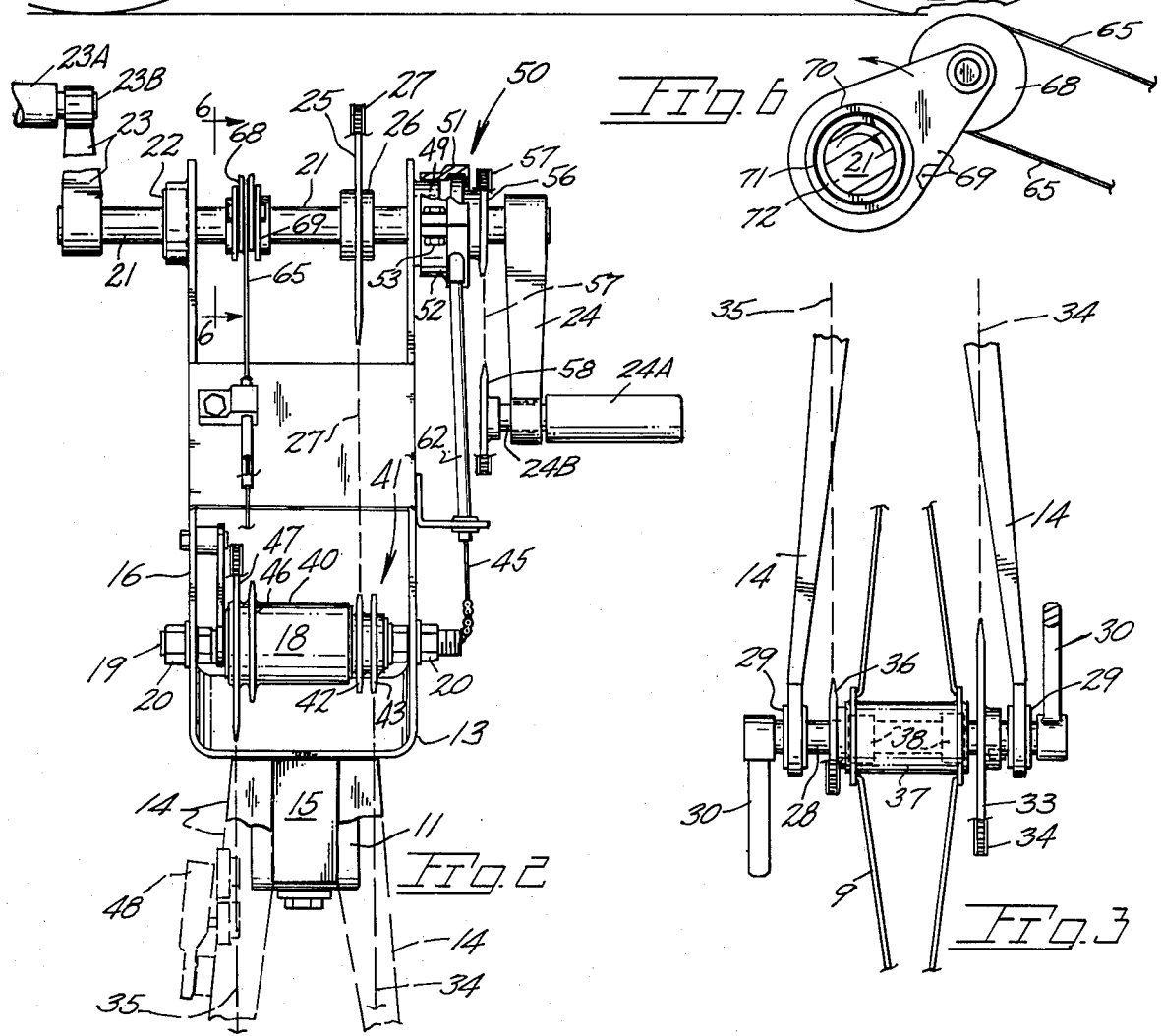

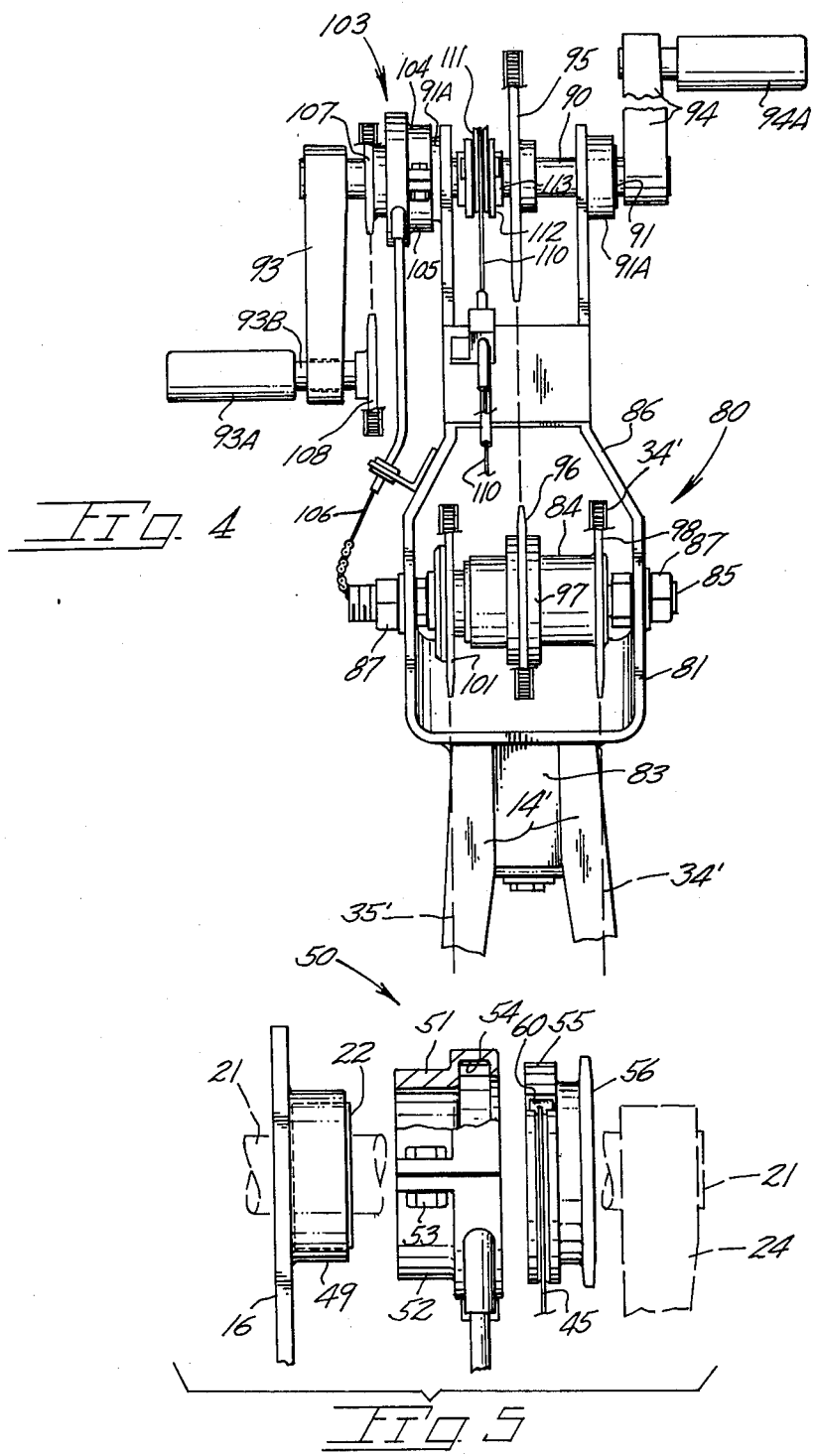
Fig. 4
Fig. 5
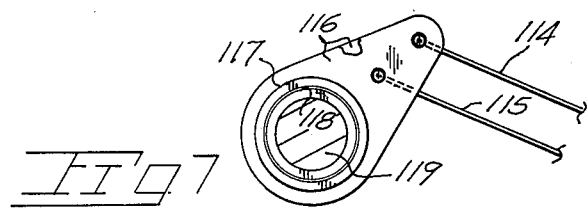
Fig. 7

VEHICLE MULTISPEED DRIVE SYSTEM UTILIZING ARM AND LEG POWER

BACKGROUND OF THE INVENTION

The present invention relates generally to a multispeed drive system utilizing both arm and leg power of an operator applied to a vehicle wheel.

The concept of imparting both leg and arm power to a wheel of a wheeled vehicle is within the present state of the art. The present inventor is the patentee of U.S. Pat. No. 3,910,599 issued Oct. 7, 1975 and the applicant of pending U.S. patent application filed Aug. 10, 1979 Ser. No. 065,458. Both of the prior inventive efforts are embodied within vehicle drive systems which impart arm and leg power to a driving wheel with provision made for driving said wheel at variable speeds.

Other examples of driving a powered vehicle wheel with arm and leg motion are disclosed in the following patents: U.S. Pat. Nos. 329,755; 376,241; 2,004,683; 2,390,719; 2,533,728; 3,193,305; 3,823,959, British Pat. Nos. 426,044; 515,317; French Pat. No. 743,559 and other patents.

The most pertinent prior art is believed to be the system disclosed in the present applicant's earlier mentioned U.S. Pat. No. 3,910,599 which utilizes a jack shaft remotely powered by arm and leg motion with the jack shaft in turn driving, via a roller chain, a multispeed front wheel mounted hub. While the subject matter of said patent is fully functional and has been successfully practiced, a drawback is encountered in that it is costly to manufacture and results in a somewhat heavier than conventional bicycle.

SUMMARY OF THE PRESENT INVENTION

The present invention is embodied within a drive system for an operator powered vehicle with the system incorporating a multispeed hub assembly remotely located from a wheel axle and driven by arm and leg power with the hub assembly being in driving engagement with a wheel hub of the vehicle.

A wheel supported vehicle is disclosed which may be a bicycle having a front wheel constituting a driving wheel. A drive system therefor includes a fork assembly on which is mounted, above the wheel, a multispeed hub of largely conventional design. The hub is mounted within a fork extension at the upper end of which is journalled a hand crankshaft. A sprocket on the hand crankshaft is in roller chain engagement with the multispeed hub carried by the fork extension. A front axle mounted sprocket is also in driving engagement with the hub and, accordingly, arm and leg power imparted respectively to the hand crankshaft and the front axle is transmitted to said hub. As earlier noted, the multispeed hub is of largely conventional design and is of the general type widely used to support the rear wheel of conventional bicycles. The present hub is modified to receive rotational forces from two different sources. A second form of the invention includes a multispeed hub having at least two hub driving sprockets affixed to the hub shell. Contrary to conventional hub operation, the shell in turn drives a driven sprocket all mounted on the hub axle.

Important objectives of the present invention include the provision of an arm and leg powered drive system for a vehicle which system is of simplified design incorporating a multispeed hub assembly disposed adjacent and coupled to a vehicle driving wheel; the provision of a drive assembly for a vehicle utilizing a modified multispeed hub of the general type heretofore used to drive a rear bicycle wheel; the provision of a drive system utilizing a multispeed hub assembly with provision made for changing hub speeds by actuation of a shifting mechanism coupled to a handgrip to permit a speed change without the rider removing either hand from a pair of handgrips; the provision of a drive system in which a brake component may be incorporated for simultaneously actuating the brakes acting on different wheels of the vehicle.

BRIEF DESCRIPTION OF THE DRAWINGS

In the accompanying drawings:

FIG. 1 is a side elevational view of a vehicle incorporating the present drive system;

FIG. 2 is an elevational view taken along line 2—2 of FIG. 1 disclosing drive system components;

FIG. 3 is an elevational view taken along line 3—3 of FIG. 1 showing additional drive system components;

FIG. 4 is a view similar to FIG. 2 showing a modified form of the invention;

FIG. 5 is an exploded view of a gear shifting mechanism;

FIG. 6 is a vertical sectional view taken along line 6—6 of FIG. 2 and showing, on a slightly enlarged scale, a brake component; and FIG. 7 is a side elevational view of a modified brake mechanism.

DETAILED DESCRIPTION OF THE PREFERRED EMBODIMENTS

With continuing attention to the drawings, wherein reference numerals indicate parts similarly hereinafter identified, the reference numeral 1 indicates a frame of a bicycle. It will be understood that other types of vehicles may be powered with the present system. Pairs of rearwardly projecting arms 2 and 3 jointly support a rear wheel bracket 4 which in turn carries a rear wheel 5. A seat back at 6 includes brackets 6A which are carried by an upright frame carried seat support 7. A seat base 6B is adjustably mounted at 6C on frame 1. A head tube at 8 receives a fork clevis at 11 swingably attached by means of a fork pin 10. A front vehicle wheel is at 9. The foregoing is intended to be exemplary only of vehicle structure with which the present drive system may be advantageously used.

The present drive system is indicated generally at 12 and includes a fork structure 13 having forks 14 carried by a fork support member 15 which additionally serves, along with clevis structure 11, to support a fork extension at 16. Said fork extension may be of plate construction of suitable lightweight nature.

The fork extension mounts a multispeed hub assembly 18 (FIG. 2) having an axle 19 suitably secured in place by axle nuts 20. Further details of the multispeed hub are provided later. At the fork extension upper end is a hand crankshaft 21 journalled within bearings 22. At the crankshaft ends are hand cranks 23-24 each having a rotatably mounted handgrip 23A-24A carried by spindles 23B-24B.

Hand crankshaft 21 also carries a roller chain sprocket 25 preferably mounted on a unidirectional roller clutch assembly at 26 to enable selective driving of a roller chain 27 for reasons later stated.

Forks 14 are adapted at their lower ends to receive bearings 29 within which a live axle 28 is journalled with said axle fitted at its ends with pedal arms 30 each in turn having a pedal 31 (FIG. 1) to enable the application of leg power to live axle 28. Secured to live axle 28 for rotation therewith is a front wheel roller chain sprocket 33 on which is entrained a roller chain 34. A second roller chain 35 constitutes drive transmission means and imparts rotation to the vehicle powered wheel assembly including wheel 9 by entrainment about a sprocket 36 which in turn imparts rotary motion to a front wheel hub 37 of said assembly. Sprocket 36 and front wheel hub 37 are rotatably mounted on live axle 28 by means of hub bearings 38 enabling independent rotation of vehicle front wheel 9 relative live axle 28.

With attention now to multispeed hub assembly 18 in place on the fork extension adjacent the vehicle front wheel, said hub may be of substantially conventional design having a hub shell 40 which as typically used has spoke mounting annular flanges which flanges are presently dispensed with. A hub driver assembly is indicated generally at 41 and includes hub driving sprockets 42 and 43 with sprocket 42 in driven engagement with hand crankshaft sprocket 25 while sprocket 43 is powered by front axle mounted sprocket 33. Hub driver assembly 41 includes conventional drive components for selective engagement with other internal hub components to power said hub. The hub additionally houses a shifting mechanism which mechanism is actuated by a flexible control member at 45 as later elaborated upon.

Mounted on the multispeed hub shell 40 are hub driven sprockets 46 and 47 which are in selective entrainment with roller chain 35 by means of a chain shifter mechanism 48 which may be of the derailler type and mounted on a fork 14. Such chain shifting devices are well known in the bicycle art and may be briefly described as a chain-displacing mechanism capable of laterally displacing a chain run for purposes of changing chain entrainment from one sprocket to another sprocket. In an entirely satisfactory form of the invention the multispeed hub shell 40 may be provided with but a single sprocket in which instance the chain displacing mechanism is dispensed with.

A speed control for hub assembly 18 is indicated generally at 50 and includes a segmented holder 51, 52 (FIGS. 2 and 5) joined so as to have an inner periphery in biased securement with bearing retaining collar 49. A fastener assembly 53 enables such securement. The segmented holders jointly define an annular groove 54 within which is rotatably confined a circular plate 55. Coupled with plate 55 is a speed control sprocket 56 which sprocket is in chain engagement via a roller chain 57 with a second sprocket 58 affixed to a handgrip spindle 24B. Speed control sprocket 56 is coaxial with hand crankshaft 21 while its cooperating sprocket 58 is coaxial with handgrip spindle 24B. With attention again to circular plate 55, the same defines a recess within which is received a control cable fitting 60 on flexible control 45. Accordingly, flexible speed control 45 may be drawn upwardly as viewed in FIG. 2 within its housing 62 in opposition to internal spring biased hub components which act in an opposite direction. From the foregoing it will be seen that movement may be imparted to flexible control member 45 when handle sprocket 58 is manually rotated about the axis of handle 24A during orbital travel of the handgrip and its associated sprocket about hand crankshaft 21. As sprockets 56 and 58 are identical, no rotary motion is imparted to sprocket 56 because of orbital travel of sprocket 58.

In FIG. 6, a novel brake actuating mechanism tensions a brake cable 65 serving caliper assemblies at 66 and 67. The cable is uniformly tensioned by clutch mounted means shown as a pulley wheel 68 carried by arms 69. During braking, arcuate motion is imparted to arms 69 in the direction of the applied arrow by an outer clutch member 70 of a unidirectional clutch 71 having an inner clutch member 72 carried by crankshaft 21. The clutch permits overrunning of the shaft in a clockwise direction as viewed in FIG. 6 while counterclockwise shaft rotation causes engagement of the clutch members with consequent tensioning of the brake cable. An advantage of utilizing a single brake cable resides in uniform cable tensioning and brake application.

In FIG. 4, I show a modified form of the present drive system wherein a multispeed hub functions in a reverse manner from its normal use, i.e., driving forces are imparted to the hub by sprockets on the hub shell which, in turn, drives through internal gearing an output sprocket the latter in driving engagement with a vehicle wheel. In the modified form, the reference numeral 80 indicates generally the drive system having a fork structure 81 including forks 14' carried by a support member 83. The lower fork ends and driven wheel are as shown in FIG. 3. A multispeed hub assembly is indicated at 84 mounted on an axle 85 secured in place within a fork extension 86 by means of nut elements 87. A hand crankshaft at 90 is journalled within the upper end of the fork extension by bearings 91 within retainers 91A with the shaft being equipped with hand cranks 93, 94 and handgrips 93A, 94A. A sprocket 95 on said hand crankshaft drives hub driving sprocket 96. A unidirectional roller clutch bearing 97 allows overrunning of the hub shell relative to sprocket 96 to enable the rider's arms and hand crankshaft to be motionless if desired. A second driving sprocket at 98 is in roller chain engagement at 34' with front axle mounted sprocket as at 33 in FIG. 3. Multispeed hub 84 includes internal gearing driven by the hub shell which gearing drives a hub driven sprocket at 101 which in turn drives, via a roller chain 35', sprocket 36 in FIG. 3. In its present use, multispeed hub 84 transmits rotary forces in a manner opposite to normal or other installations since sprocket 101 is presently utilized as a hub driven sprocket instead of serving as a driver for hub 84.

A speed control mechanism is indicated generally at 103 for the modified drive system and is similar to the first described speed control mechanism at 50. The mechanism includes a segmented holder at 104 and 105 in clamped securement about a crankshaft bearing retainer 91A. A flexible control member at 106 terminates upwardly within the holder and specifically coupled to a circular plate in the manner shown with the first form of the invention. A sprocket 107 is coupled to said plate and imparts rotary motion thereto to impart linear motion to control 106. Rotary motion is imparted to sprocket 107 by axial rotation of an operating sprocket 108 carried by a handgrip spindle 93B of handgrip 93A to permit speed changes of the hub by handgrip rotation during orbital travel as described with the first form of the invention.

In FIG. 4, a brake mechanism is disclosed in place on hand crankshaft 90 which mechanism is similar to that shown and described with the first form of the invention. A brake cable at 110 is tensionable by clutch mounted means including a pulley wheel 111 carried by arms 112 which in turn is mounted on a unidirectional clutch 113. Said clutch permits normal rotation of crankshaft 90 in a counterclockwise direction, as viewed from the lefthand side of FIG. 4, while crankshaft rotation in an opposite direction causes an inner clutch member to engage internal clutch components and impart counterclockwise motion to an outer clutch member resulting in arm movement and tensioning of brake cable 110. As with the earlier described brake mechanism, brake cable 110 terminates at its unseen ends at front and rear wheel caliper brake assemblies.

A still further modified form of brake actuating mechanism includes separate brake cables 114 and 115 each terminating at its unseen end in attachment with vehicle wheel brake assemblies 66–67. This latter brake mechanism dispenses with the earlier noted pulley wheel and instead utilizes clutch mounted means 116 carried by a roller clutch member 117 of a unidirectional clutch 118 on a handcrank 119 all being as earlier described. Multispeed hub assembly 18 may be that assembly manufactured by the Sturmey Archer Company and identified as "TCW Combined 3-Speed Gear Coaster Brake" modified by the addition of sprockets to the hub shell 40 and to the hub drive assembly.

The unidirectional clutches above mentioned may be that type manufactured by the Torrington Company, part number RC-081208. The multispeed hub assembly may be of the types manufactured by the Sturmey Archer or Shimano Companies with but the above mentioned exterior modification.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

I claim:

1. A drive system for a vehicle enabling use of the operator's arms and legs to provide a source of motive power to a vehicle wheel, said system comprising,
   a live axle and sprocket combination adapted for rotation by the operator's legs,
   a powered wheel assembly rotatably journalled on said live axle, said wheel assembly including a sprocket and hub,
   a hand crankshaft and sprocket combination having handgrips and adapted for rotation by the operator's arms,
   a multispeed hub assembly adjacent said powered wheel assembly including hub driving sprockets and a hub driven sprocket,
   power transmission means coupling the live axle sprocket and the hand crankshaft sprocket to said hub driving sprockets, and
   drive transmission means coupling the hub driven sprocket to the powered wheel assembly.

2. The system claimed in claim 1 wherein said multispeed hub assembly is of the type including an internal coaster brake mechanism, one of said hub driving sprockets also functional to actuate said internal coaster brake mechanism.

3. The system claimed in claim 1 additionally including a unidirectional clutch in place on said hand crankshaft imparting rotation to said hand crank sprocket in one direction and alternatively permitting overrunning of the crankshaft in an opposite direction to permit a static hand crankshaft during multispeed hub assembly rotation.

4. The system claimed in claim 1 wherein said multispeed hub assembly includes a hub shell, said hub driven sprocket in place on said shell.

5. The system claimed in claim 1 including a speed control for shifting said multispeed hub assembly, said speed control including a flexible member attached to said multispeed hub assembly and manually actuated by an operator's hand.

6. The system claimed in claim 5 wherein said speed control additionally includes a handgrip mounted sprocket, a second sprocket in roller chain connection with the handgrip mounted sprocket and concentrically disposed about said hand crankshaft so as to permit orbital travel of the handgrip mounted sprocket without rotation being imparted to the second sprocket, coupling means attached to said flexible member and actuated by the second sprocket upon rotation of the handgrip sprocket to impart linear movement to said flexible member for shifting the multispeed hub assembly.

7. The system claimed in claim 1 additionally including a brake actuating mechanism carried by said hand crankshaft, said brake actuating mechanism including a unidirectional brake clutch on said hand crankshaft and clutch mounted means adapted to impart linear motion to a brake cable associated with a vehicle wheel caliper brake.

8. The system claimed in claim 1 wherein said multispeed hub assembly includes a hub shell, unidirectional clutch carried by the hub shell and mounting a hub driving sprocket thereon to permit a static hand crank during hub shell rotation.

9. The system claimed in claim 8 including a speed control for shifting said multispeed hub assembly, said speed control including a flexible member attached to said multispeed hub assembly and manually actuated by an operator's hand.

10. The system claimed in claim 9 wherein said speed control additionally includes a handgrip mounted sprocket, a second sprocket in roller chain connection with the handgrip mounted sprocket and concentrically disposed about said hand crankshaft so as to permit orbital travel of the handgrip mounted sprocket without rotation being imparted to the second sprocket, coupling means attached to said flexible member and actuated by the second sprocket upon rotation of the handgrip sprocket to impart linear movement to said flexible member for shifting the multispeed hub assembly.

11. The system claimed in claim 10 additionally including a brake actuating mechanism carried by said hand crankshaft, said brake actuating mechanism including a unidirectional brake clutch on said hand crankshaft and clutch mounted means adapted to impart linear motion to a brake cable associated with a vehicle wheel caliper brake.

* * * * *